US006954796B2

(12) United States Patent
Tan et al.

(10) Patent No.: US 6,954,796 B2
(45) Date of Patent: Oct. 11, 2005

(54) TIME BASED MULTIMEDIA OBJECTS STREAMING APPARATUS AND METHOD

(75) Inventors: Pek Yew Tan, Singapore (SG); Kok Leong Ng, Singapore (SG)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/848,379

(22) Filed: May 19, 2004

(65) Prior Publication Data

US 2004/0215805 A1 Oct. 28, 2004

Related U.S. Application Data

(62) Division of application No. 09/709,726, filed on Nov. 13, 2000, now Pat. No. 6,917,984.

(30) Foreign Application Priority Data

Jan. 7, 2000 (SG) ........................................ 200000085

(51) Int. Cl.[7] ................................................ G06F 15/16
(52) U.S. Cl. .......................................... 709/231; 710/52
(58) Field of Search ........................... 709/231; 710/52; 370/378; 348/423.1

(56) References Cited

U.S. PATENT DOCUMENTS 5,481,312 A * 1/1996 Cash et al. ............ 375/240.28
5,648,958 A * 7/1997 Counterman ................ 370/458
5,864,540 A 1/1999 Bonomi et al.
5,918,020 A 6/1999 Blackard et al.
6,414,960 B1 7/2002 Kuhn et al.
6,418,140 B1 * 7/2002 Matsui ........................ 370/378
6,578,092 B1 6/2003 Lau et al.
6,693,909 B1 2/2004 Mo et al.
6,721,271 B1 4/2004 Beshai et al.
6,760,877 B1 * 7/2004 Lappetelainen et al. .... 714/748

FOREIGN PATENT DOCUMENTS

EP 0701376 3/1996
EP 0738083 10/1996

OTHER PUBLICATIONS

"High Quality and Scalable Audio–Visual Content Delivery", by Pek Yew Tan et al., (Nov. 1999), Proceedings of the 4$^{th}$ IEEE Malaysia International Conference on Communications and 4$^{th}$ IEEE Asian Pacific International Symposium on Consumer Electronics, vol. II, pp. 53–56.

* cited by examiner

*Primary Examiner*—Mehmet B. Geckil
(74) *Attorney, Agent, or Firm*—Greenblum & Bernstein, P.L.C.

(57) ABSTRACT

A method is provided for scheduling the transmission time of multimedia objects. The method includes dividing the transmission time into frames based on an object decoding rate. The transmission time is further divided within each frame of the multimedia object channel into time slots. The number of time slots is equivalent to dividing the transmission rate by the multimedia object decoding time. A delivery time schedule of multimedia objects is formed with a time stamp within the scheduled object delivery period or frame period. A scheduled object delivery period is computed which is equivalent to the maximum object group delay period allowable. Objects that cannot be delivered within a current time slot are re-scheduled to a later time slot.

5 Claims, 10 Drawing Sheets

TIME BASED MULTIMEDIA OBJECTS STREAMING APPARATUS AND METHOD

CROSS-REFERENCE TO RELATED APPLICATION

This application is a division of U.S. patent application Ser. No. 09/709,726, filed on Nov. 13, 2000 now U.S. Pat. No. 6,917,984, the content of which is hereby incorporated herein by reference in its entirety.

BACKGROUND AND FIELD OF THE INVENTION

This invention relates to the transmission of real time data between a sender and receiver over a transmission network.

The current delivery of real-time data depends very much on the feed back channel from the receiver to the sender which provides a report on the received data transmission. Based on this feedback report, the sender will take appropriate action for the transmission of subsequent data to the receiver. The action taken by the sender may require reservation of more network resources for end-to-end data delivery and re-transmission of lost data. Re-transmission of lost data requires the receiver end to report specifically the amount of lost data encountered before the entire data can be of use to the applications at the receiver end. For a large system having a large number of servers and clients, the report messages between the terminals utilise a considerable amount of bandwidth.

In both connection and connectionless data networks, data packets at the lower layers such as the network layer differentiate data only by priority or time-to-live parameters. The distinction made between data packets at the network layer does not relate the coupling nature of the application layer data fragmented into data packets for network layer delivery. Some of these data packet parameters used to distinguish the various classes of service between data packets are listed in the IETF (Internet Engineering Task Force) RFC 791 on Internet Protocol version 4 and IETF's RFC 2460 on Internet Protocol version 6. In the current specifications for Differentiated Service as mentioned in IETF's RFC 2474, RFC 2475, RFC 2597 and RFC 2958, only a means to provide data packet marking is provided. IP data packets with special marking allow the network components such as routers or switches to treat the IP data packets based on the packet's different Quality of Service fields or DSCP, as an indicator on how data flow should be determined. The re-transmission and dropping of data packets belonging to a specific stream is performed at the IP packet level without any knowledge of the application data. Data packet differentiation is only performed at the packet level and selective dropping of a group of data packets is almost impossible if this process has to be performed at the network level.

Without the additional information from the application software, a data packet that makes it though the network may consist of only part of the data the application software needs. With the re-transmission of the missing data that finally arrives at the receiver end, a strict real-time requirement in most instances cannot be met. A data object that arrives not adhering to the real-time requirement is said to be of no presentation value because the time for decoding the piece of information has already passed. As a result, network resources are used in delivering real-time data of no value to the end user. In addition, the non-presentation value group of data packets may cause unnecessary network congestion at the already strained intermediate network nodes. In many instances the congestion of network traffic may be prolonged and in a worst case scenario the traffic congestion may spread to a wider area.

For most real-time data streaming across a packet data network, the decoding rate for the data is only made known to the end devices, for instance the server and the end client. In many instances, the server can only deliver data at the rate based on the decoding rate of the data and a report sent from the client giving statistics of the data received. In some implementations, a large data buffer or an arbitrary size of data buffer needs to be pre-allocated at the client side before the streaming of data from the server to the client can begin. In the scenario where a wide area network is constructed based on a number of intermediate network nodes such as routers and switches which have no information on the type of data and how the data should be treated for end-to-end delivery, the intermediate nodes have no real-time streaming knowledge of the network packets arriving and leaving the nodes. In the event of network congestion at one of the intermediate nodes there is no means to deliver or re-schedule the delivery of network data packets that makes sense from the view of the application data. In most cases only a partial object data is successfully delivered to the end terminals and re-transmission of lost data may be performed automatically by the network layer.

SUMMARY OF THE INVENTION

According to the invention in a first aspect, there is provided a method of sending a data object through a communications network from a sender to a recipient via at least one network node comprising the steps of:

a. dividing the data object into a stream of data packets to be transmitted,
b. marking each data packet with a delivery time; and
c. discarding a said data packet en route when the delivery time of the said packet cannot be met.

According to the invention in a second aspect, there is provided a method of creating synchronised time stamped multimedia objects comprising the steps of:

a. fragmenting the data objects into one or more data packets;
b. marking each data packet containing a part or full portion of a single multimedia object using a unique reference;
c. creating a link for related fragmented network data packets originating from the same multimedia object using an object reference before transmission;
d. stamping the data packets related to the object reference with a time reference marking the instance the data packet leaves a transmission node; and
e. attaching a precedence level of the object based on the object reference.

According to the invention in a third aspect, there is provided a method for scheduling the transmission time of multimedia objects comprising the steps of:

a. dividing the transmission time into frames based on an object decoding rate;
b. further dividing the transmission time within each frame of the multimedia object channel into time slots, the number of time slots being equivalent to dividing the transmission rate by the multimedia object decoding time;
d. forming a delivery time schedule of multimedia objects with a time stamp within the scheduled object delivery period or frame period;
e. computing a scheduled object delivery period which is equivalent to the maximum object group delay period allowable; and
f. re-scheduling objects that cannot be delivered within a current time slot to a later time slot.

According to the invention in a fourth aspect, there is provided an apparatus for interconnecting an object streaming apparatus into existing network interconnection apparatus to control data traffic generated by the multimedia object streams comprising:

a. an ingress gateway to control entry of data packets into a network;
b. a content traffic exchange hop attached to legacy switching or a routing network component; and
c. an egress gateway to control the exit of data packets from the network and to stream content to end-users.

The described embodiment of the invention uses a system architecture that allows end-to-end streaming of time based objects. An input data object from an object stream entering the network is marked and disassembled by an ingress object traffic controller.

In the ingress object traffic controller, a large data object is fragmented into a plurality of smaller network data packets as specified by the chosen network layer for delivery. Each network data packet is marked according to the precedence level desired by the application entities at the source of the object stream. To provide the network data packets with linkage and real-time information, each object has an object descriptor created. Based on the real-time requirement and the network resources allocated for the delivery of the object stream, a time for an object frame is computed and created for the delivery of time-stamped object data. The data information of the object descriptor is mapped to the header of the network data packet where possible or is encoded into the payload.

At each of the intermediate nodes such as routers and switches connected with the apparatus, the data packet is received. The data packet is re-routed to the host using an egress object traffic controller if the data object has reached the final destination, otherwise the packet is processed by an exchange object traffic controller for re-transmission to another network node. In the egress or exchange object traffic controller, the object descriptor for each stream is collected and a timer circuit is spawned for each object stream.

Based on the timing information, a system object frame is created dynamically and the number of time slots per object frame is computed. The time slots are used to mark the delivery time of the object data. The time schedule for the delivery of the object based on time slots is performed based on a traffic shaper or filter adopted for the stream. Object data meeting the criteria of the traffic shaper is put in the object stream queue and object data not meeting the requirement of the traffic shaper is stored in a cache memory for a generalised lower priority object data scheduling. An object decoding period is determined from the set of object stream descriptors received. One or more object decoding time slots are allotted for the object data to be delivered to meet real-time criteria in the stream object queue. After completing scheduling the object data that will expire within the object time frame in the stream object queue and data objects in the stream object cache memory are scheduled next. After the object has been scheduled, excess time slots are saved for future object frames. If there are insufficient time-slots, additional time-slots are allocated from the reserves to meet the need. If there are insufficient time-slots for delivery, object data that expires in the next object frame is discarded.

Data object packets scheduled for re-transmission are then re-assembled based on the output network criteria and a network header is mapped accordingly. The process is repeated for the data object in the exchange object traffic controllers of the intermediate nodes within the service provider domain until the final destination has been reached.

The described embodiment of the invention provides an apparatus and a method for the delivery of scalable multimedia objects to meet real-time applications on a heterogeneous network. These scalable multimedia objects may contain synchronised audio, video and data information for interactive, communicative and broadcast applications over a wide area network. The described embodiment provides a multimedia objects streaming method based in network resource availability at each network component and it allows real-time end to end delivery of multimedia objects with minimal effect on the presentation quality of the multimedia object over networks with dynamically changing network resource parameters such as varying bandwidth, delay and latency jitters. The described embodiment provides a method and an apparatus that allows fast high level application data context switching and routing at the network layer.

The described embodiment of the invention further allows the delivery of data without additional feedback from the receiver and thus cuts down on the complexity in the protocol needed by both ends of the users to handle a feedback report. The processing power needed for the client to perform the reporting based on the data received from the server is also reduced.

The described embodiment further provides a means to deliver real-time and near real-time multimedia object delivery of different decoding rates in a connectionless oriented connection accurately based on individual decoding rate. The described embodiment further allows synchronisation of the time based object streams such that real-time delivery specified for the object stream can be meet accurately without an accurate timer being implemented by the host network node.

The described embodiment provides a mechanism to perform network congestion avoidance at each intermediate network node dynamically at the rate equivalent to the smallest decoding rate from a set of decoding rates from the object streams and also allows link information between data packets belonging to the same data object to be retained as the data is being fragmented and delivered across the network.

For real time delivery, the intermittent delay is kept at the maximum constant delay such that end to end delay for the arrival of all data objects is kept at a constant rate over time.

The content data switching can be performed at the network level, thus freeing the application level from the rudimentary work of re-transmitting of content object data received.

With the ability to couple fragmented data packets originating from a single data object, the described embodiment enables routers or intermediate network nodes between end-to-end users to drop data packets of the data objects with no presentation value. A data object without presentation value is one where the data object cannot arrive at the end user at the decoding rate. This prevents non-presentation data objects causing network congestion by dropping the said data objects.

A timer to improve synchronisation without the need for a central control time or network time protocol to keep synchronisation between network nodes is provided. The described embodiment allows an accurate means to estimate the decoding time of each object belonging to different object streams.

The described embodiment also allows a single network traffic controller to control object streams with different traffic shaper or filtering algorithms.

The described embodiment allows the existing network configuration to use the implementing apparatus to control real-time traffic over wide area network such as the internet or corporate wide intranet. The described embodiment also provides an infrastructure for the content provider to stream AV content to the users in real-time and the amount of data objects to be delivered to end used can varies depending on the profile of the users on the data packet network such as the internet For a virtual leased line, the server can choose to stream content to their valued clients with better quality of service over the non-valued clients.

BRIEF DESCRIPTION OF THE DRAWINGS

An embodiment of the invention will now be described, by way of example, with reference to the accompanying drawings, in which.

DETAILED DESCRIPTION OF THE PREFERRED EMBODIMENT

The described embodiment of the invention provides a system and an apparatus for, and methods of, delivering multimedia objects for improved streaming at the multimedia content provider, improving the quality presentation at content consumer end and improving the network congestion at the service provider domains. The embodiment is described in the following in detail with reference to accompanying drawings. In the following description, numerous details are set forth in order to provide for thorough understanding of the described embodiment of the present invention by one skilled in the art. In some of the explanations, some obvious details that forms part of the embodiment are left out in order to not unnecessarily obscure the description.

Figure 1:
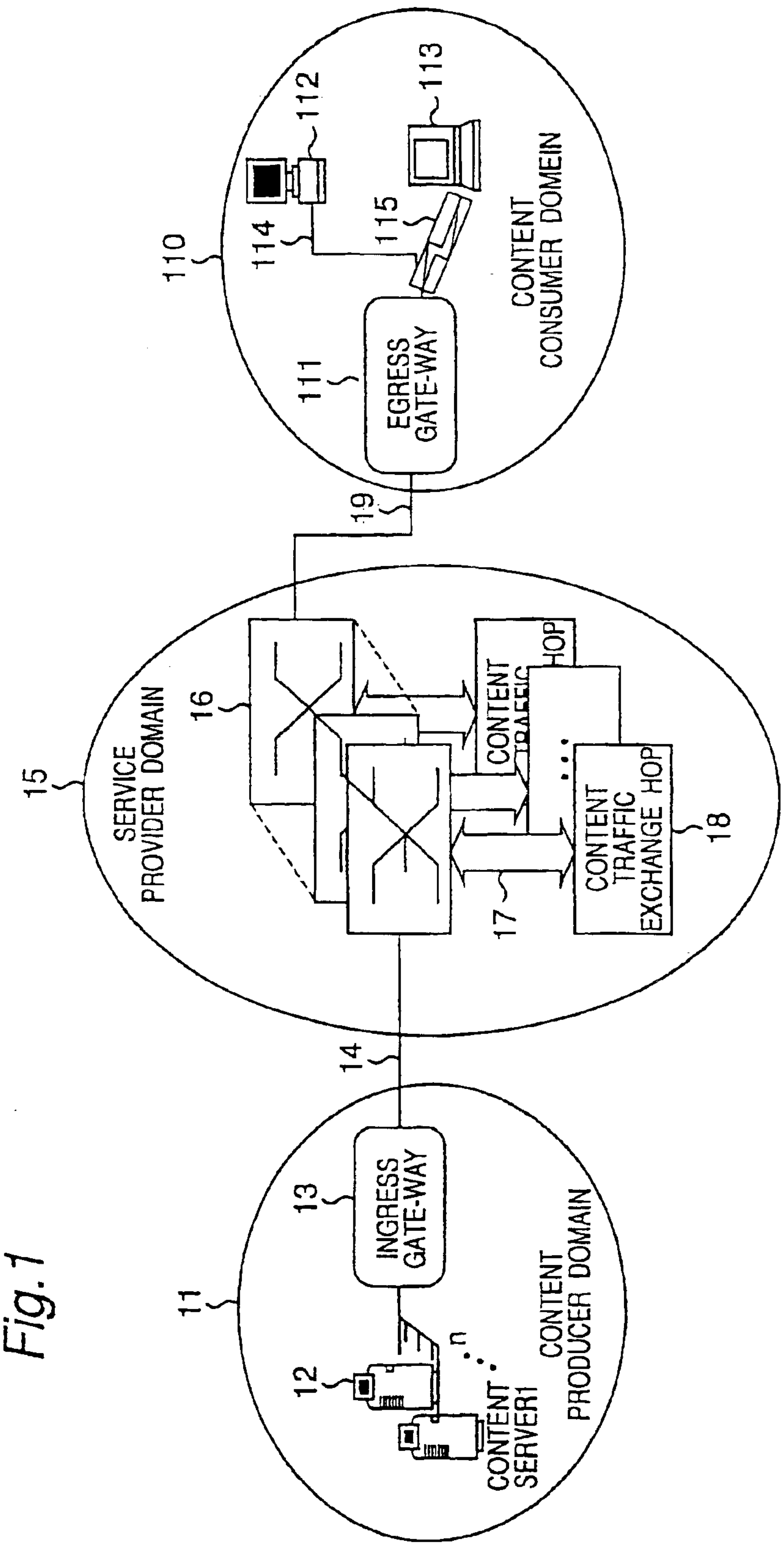
FIG. 1 illustrates the management of streamed data traffic from a multimedia server or any other client user terminal in a content provider domain to the receivers at a content consumer via a service provider domain. This figure also shows the interconnections of content stream traffic control for the three domains for the management of network resources for the efficient delivery of content.

FIG. 1 is a diagram of an exemplary network system consisting of different network functional nodes for implementing the various aspects of the embodiment of the present invention. This figure shows an additional network functional component being added to allow traffic control and management of data generated by the users in two domains: content producer 11, and content consumer 110. The physical end-users can at different instances be in either the content consumer or content producer domains depending on the flow of the object stream. The entity that ensures the end-to-end delivery of object streams is the service content provider, 15. The service provider domain 15 is connected to the content producer 11 via a network link 14, that shares the same type of network protocol and architecture as a first connected network switching element, 16. For brevity, the network component 16 is termed a switching element which is a representative network component for routing of data packets or performing label switching or layer 2/3 switching.

The service provider may contain a network of interconnected switching elements that support different network protocols and architecture. Each of the switching elements is connected to a content traffic exchange hop, 18, to perform the function of object data interchange and to control the flow of object traffic out the switching element. The connectivity between the switching element and the content traffic exchange hop 18 is via a standard link, 17, that allows data to be exchanged. The link 17 allows selected data stream flow from different end-to-end users to be controlled and managed by the content traffic exchange hop 18 before being passed back to the switching element 16.

In the content provider domain 11, traffic is generated by each server entity, 12, and is moderated by an ingress gateway, 13 to control the traffic entering the service provider domain. For brevity, the term "server" is used to describe a logical entity which is the source of content to be delivered across the network. The last switching element 16 in the service provider domain is connected to an egress gateway 111 of the content consumer domain 110, via an interconnect, 19, that shares the same type of network protocol and architecture.

The content consumer domain 110 may consist of clients with different network access profiles. These clients can either have high bandwidth, 114, fixed line access, 112, or low bandwidth, 115, mobile access, 113. The egress gateway 111 will regulate the traffic streamed to the client and the requests from the server carried out by the client.

Figure 2A:
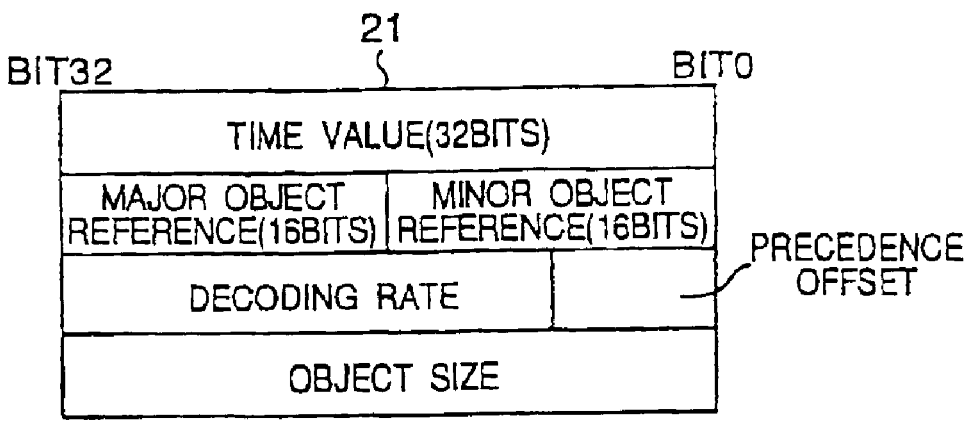
FIG. 2A shows a preferred format of an object descriptor and FIG. 2B shows a flowchart for creating a object reference from an input object stream.

Reference numeral 21 of FIG. 2A shows an exemplary descriptor used by multimedia objects these are sent to the network via an object fragmentor. The object descriptor 21 provides sufficient information for the object fragmentor to enable data packets belonging to the same object to be linked. Data packet linking is necessary as data objects from the application, in many cases if not all cases, need to be fragmented into smaller packets adapted for the network delivery layer before the objects can be delivered by the data carriers of the network layer. The descriptor includes a time value, a major object reference, a minor object reference, a decoding rate for the object, a precedence offset for the object which provides priority of delivery information and the object size.

Figure 2B:
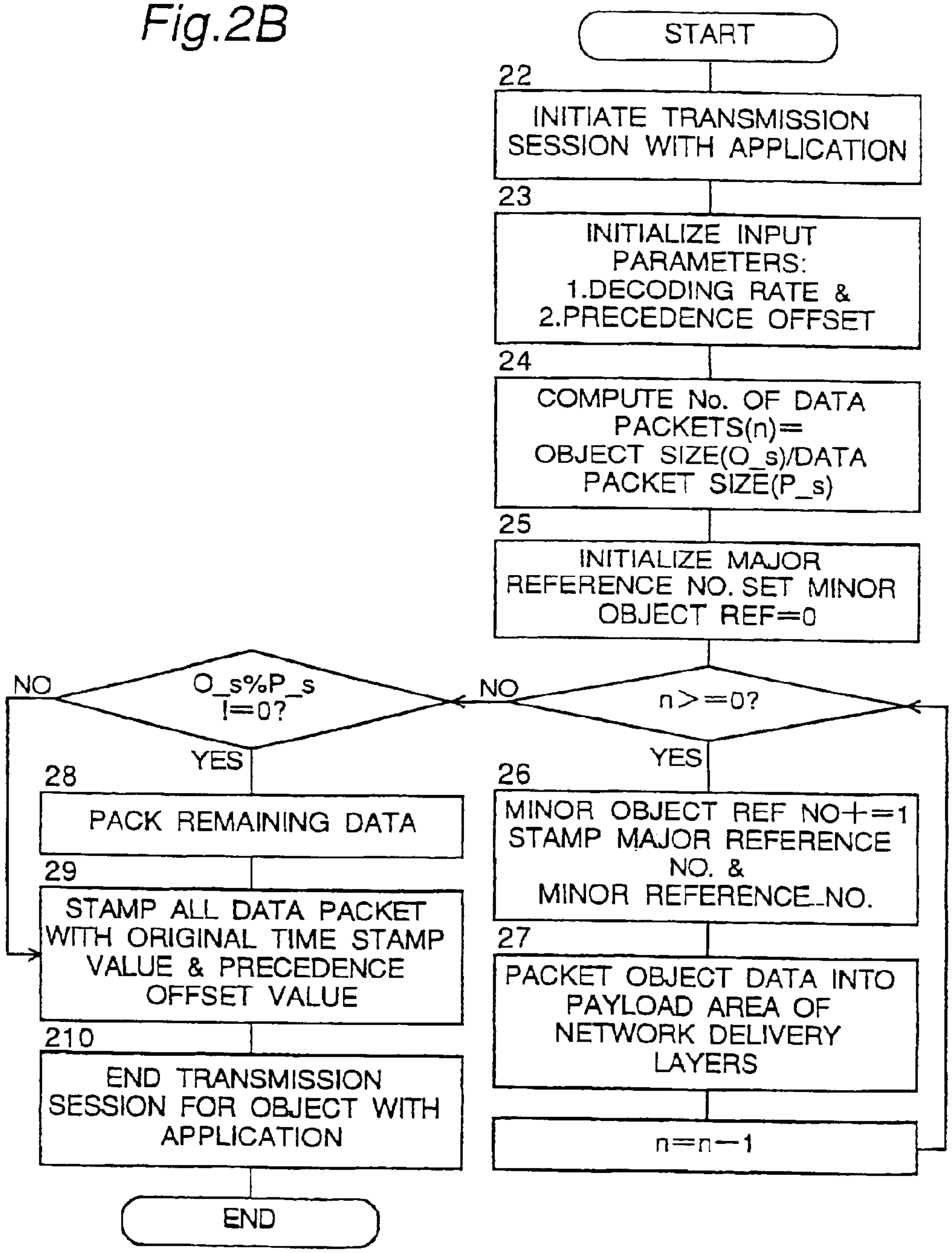

The flowchart in FIG. 2B shows the method for providing time information and linking of data packets for a fragmented multimedia object. For each transmission of object data, a session is set-up with the object fragmentor, 22. The object fragmentation process is then carried out based on the descriptor's decoding rate and precedence offset parameter at step 23. This initialisation process allows the fragmentor to decide on the object marking value of the payload of the network delivery data packet. Based on the object descriptor and the network delivery payload size, the number of data packets to be linked is determined at step 24. Each of the data payloads for the fragmented object is then stamped with a unique major object reference number, a number which the object stream uses for the entire life cycle of the session. This major object reference number is incremented by one for each session created by the application with the object fragmentor at step 25. A minor object reference number is also created starting at one and incremented for each packet of the object. For each data packet created from the object data, both the major and minor object reference numbers are stamped either as part of the data packet payload or packet data header or a representative of header information that the network data packet carries. The steps of stamping the data packet and packing of fragmented data into the payload of data packets are performed at steps 26, 27 and 28. When all the network data packets have been marked, the network data packets are time stamped, at step 29, with the same time value passed by the object descriptor. The object fragmentor will synchronise with coming object data if the decoding time rate is the same based on the time value in the object descriptor of the object reference.

Figure 3:
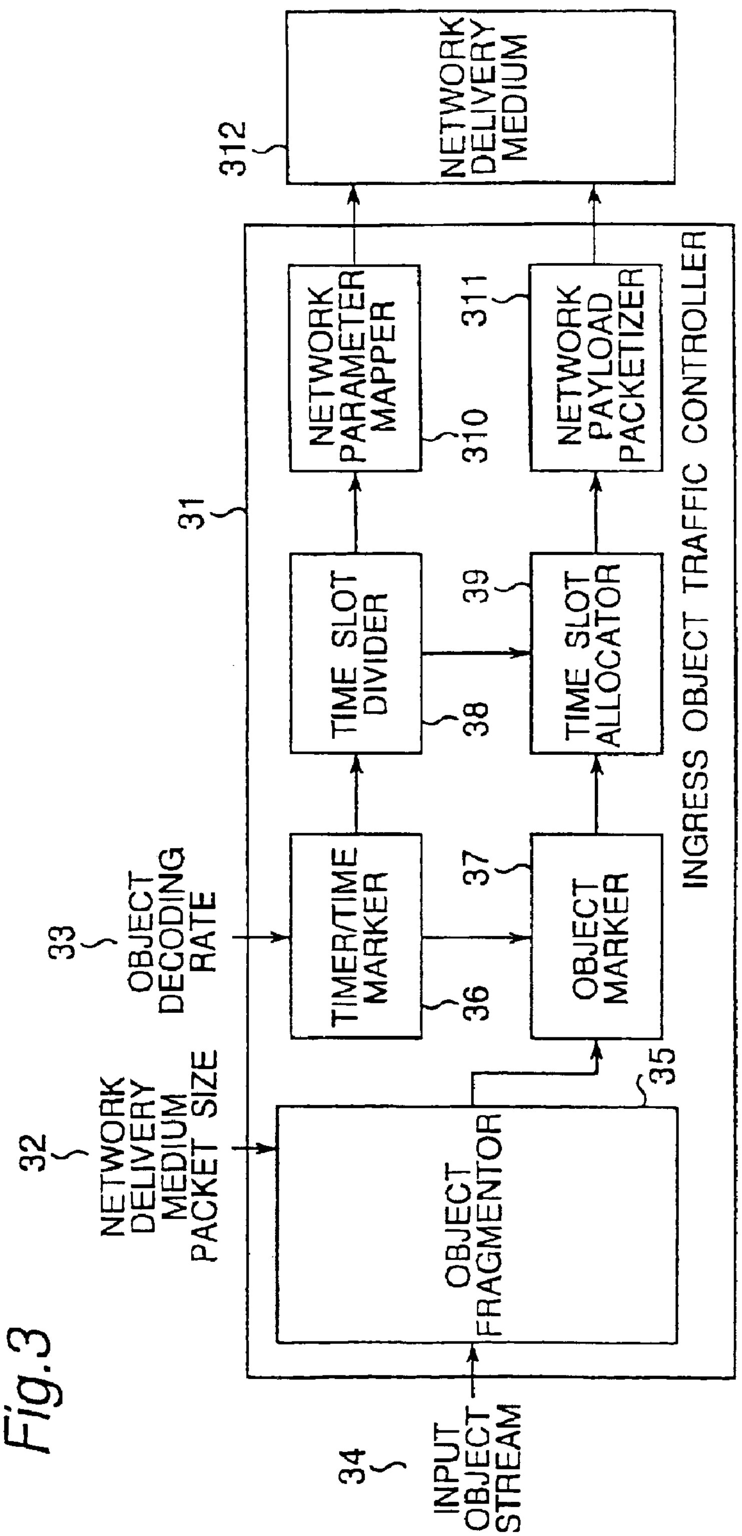
FIG. 3 is a block diagram of an ingress object traffic controller used in controlling the flow of real-time traffic into the network.

FIG. 3 shows the block diagram of an ingress object traffic controller of the gateway 13 enabling marking and controlling the flow of object data entering the network. Object data enters the ingress object traffic controller with the object descriptor, 21, passed down from the application entities. The object data is fragmented into smaller data packet payloads by the objector fragmentor, 35 based on the input network payload size, 32. For each data object divided into smaller data packets, the time is marked by the timer or time value in the object descriptor, 21 by the functional block 36. The timer derives it's time value from that of the descriptor, 21. An input decoding rate and the time value are fed into the timer block, 36, via the input 33 if the time values from subsequent object descriptors are the same. The timer value generated is fed into time slot divider, 38, where time slot transmission of object data time slots are created based on the bandwidth allocated for the delivery medium. Based on the time stamped on the data packets belonging to the same object, a time slot allocator 39 determines in which time slot the group of data packets is to be delivered to the network. For each data packet to be delivered, the data packet is mapped to a delivery network payload packetizer module, 311 which translates the timing and the object reference of the object descriptor to the header of the network data packet or encodes this as part of the network data packet's payload and the time information of the data packet is sent to a network parameter mapper module, 310 which encapsulates the fragmented object data packet into the format used for delivery to the network layer before the whole network packet is delivered to the network delivery medium, 312.

Figure 4:
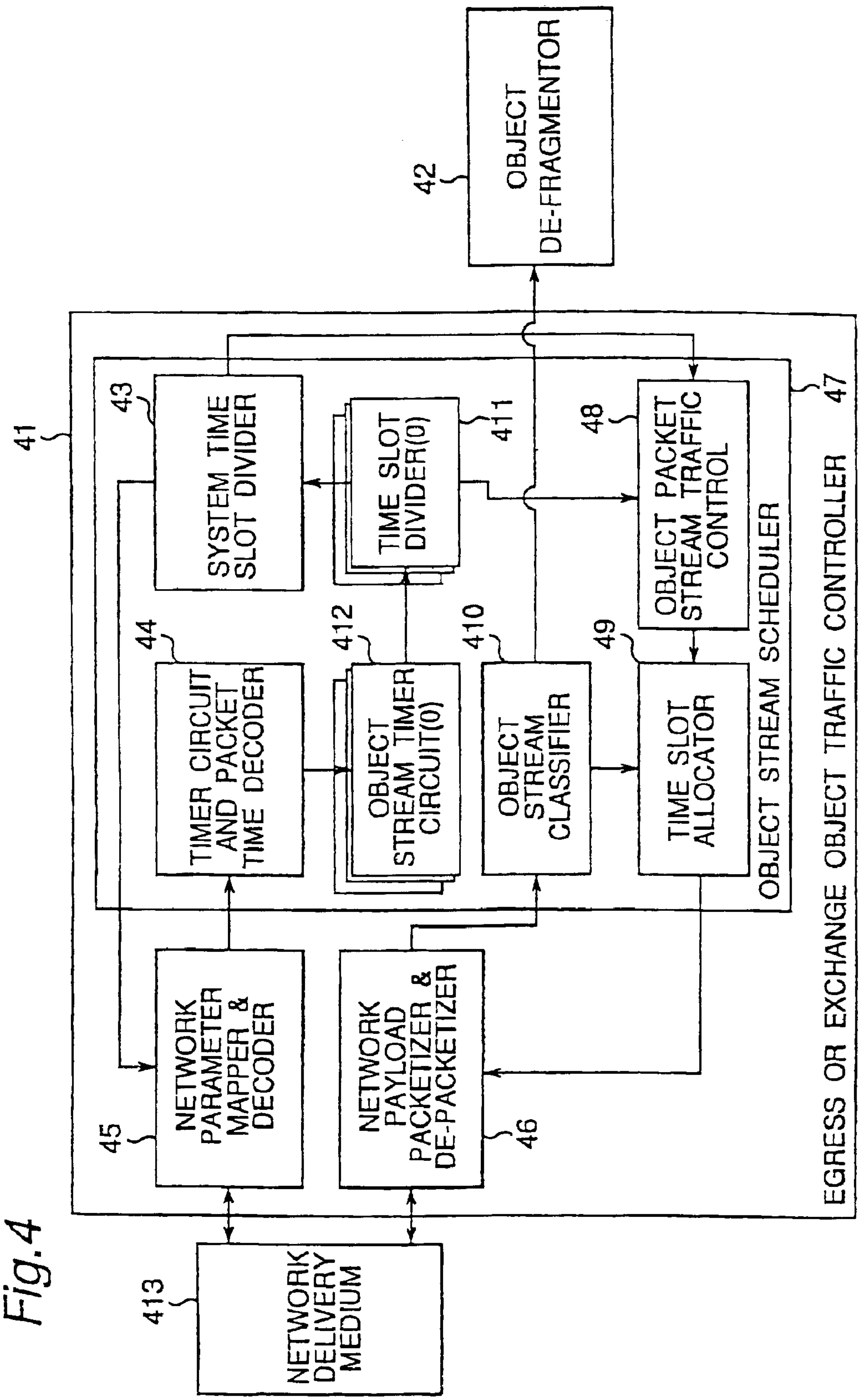
FIG. 4 is a block diagram of an egress object traffic controller and an exchange traffic controller used in the implementation of an egress network node and intermediate node for controlling the flow of real-time data.

FIG. 4 shows a block diagram of the apparatus that performs the full functions of the egress object traffic controller of the gateway 11 and a content exchange traffic controller of the content traffic exchange hop 18. The egress object traffic controller consists of the functional blocks 45, 46, 44, 410 and 42. For each network data packet received, the data packet header is parsed and decoded by the network parameter decoding function of block 45. The timing information and the object reference extracted from the header are passed for further processing to a timer circuit, 44.

Another source of timing information and object reference number can be extracted from the payload by the network payload de-packetizer function of functional block 46. The timing and object reference are only extracted from the network packet payload if the network header of the network data packets does not carry timing information and object reference number. Encoding of the timing information and the object reference number in the payload of the data packet follows the object descriptor shown in FIG. 2A.

The timer circuit, 44, contains a time stamp for each object data packet received within the object decoding frame. A handle reference is created to provide a distinction between the various object data packets received based not only on the object reference number extracted from the object descriptor but also the source and destination network address and the numeral representative of the network service access point. For the timer for the object received to work accurately within each frame, the timers in block 44 are updated or created by timing information from an object stream timer circuit, 412. The timing information is also passed to a data de-fragmentor, 42 for accurate construction of a data stream if the data stream received has reached the final destination. For the object stream received, the stream is further processed by an object stream classifier, 410, to determine a final destination of the object stream based on the unique handle reference. If the object stream has reached the final destination, the data packets are passed to the object de-fragmentor, 42. In order for the object to be re-assembled and later fed to the buffer used for object decoding, timing information from the timer circuit 412 which keeps the timers for the object stream received within one object decoding time frame is required.

In order for the host network components such as switches and routers to perform the function of a content exchange traffic controller, the functional sub-blocks in the object stream scheduler block, 47, are required. The internal clocking of the timer referenced by the unique handle reference providing all the accurate time keeping is kept by the object stream timer circuit, 412. This contains timing information for the object stream to be re-routed to another destination. For each stream received, the delivery time slots for each object data packet, based on each individual object stream decoding timing requirement and the transmission time required, are computed by a time slot divider, 411. In addition, divider 411 also provides an object packet stream traffic control, 48 with the object descriptor constructed from the data packet received via the network parameter mapper and decoder functional block, 45. Based on all of the information computed for each object stream of the time slot divider, the object stream traffic control, 48, then decides the time required for the final delivery of the object stream. Based on the precedence of the object stream carried in the object descriptor of each object stream, the time slot allocator 49 performs the final decision as to how the object data fragmented into data packets is delivered out to the network via the functional block 46. Timing information of the data object stream that is scheduled to be transmitted is performed by a system time slot divider, 43, which gathers all the information of each time slot divider 411 assigned to each object stream to determine a minimum object decoding time. The number of time slots for the node is determined by equation eq. 2 below. An object frame is determined by the system time slot divider in accordance with equation eq. 1 below.

$$\text{Object Frame}=\text{Min}(\text{DecodingRate}_{Object\ Stream\ 1}, \text{DecodingRate}_{Object\ Stream\ 2}, \ldots, \text{DecodingRate}_{Object\ Stream\ N}) \qquad \text{(EQ. 1)}$$

System time slot divider 43 performs and maintains a universal object frame for the content exchange traffic controller based on the network resources allocated for transmission. The network resources may include bandwidth, latency and total packet group delay. Information generated by divider 43 is also synchronised with the time slot allocator 49, such that the same timing information can be mapped to the network data header or encoded in the payload of the network packet carried out by the functional block 45.

To enable the exact transmission time of the object data to be transmitted out at the egress node or content traffic exchange hop, a time frame called the object frame is assigned for the object streams to be transmitted out. The pre-allocated time period for the object frame is equivalent to the time for decoding one object data as described in the object descriptor. In the case where there is a requirement to use more or less bandwidth, the object frame period can be increased and reduced. Each object frame may consist of more than one time slot depending on the bandwidth allocated for the delivery of the object data. Depending on the amount of transmission bandwidth allocated, the object frame may contain more than one time slot. The number of time slots per object frame can be computed as follows:

No. of Time Slots (n)=Transmission rate/Object Decoding rate (EQ. 2)

Figure 5:
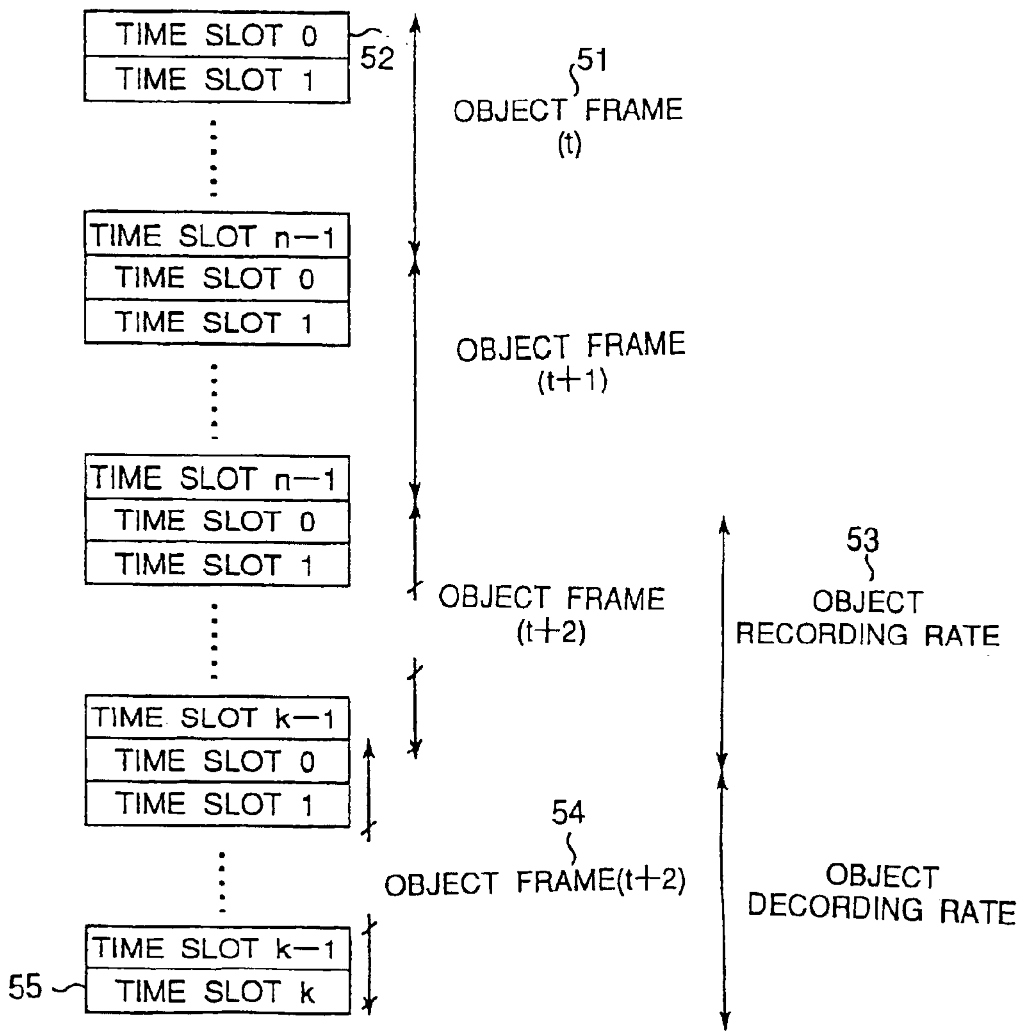
FIG. 5 is a structure of an object frame and the time slots within each object frame. This also illustrates the way the number of time slots can increase or decrease in accordance with traffic conditions.

For each object frame, only an integer number of time slots is allowed. In the case of a non-integer value as a result of eq. 2, an additional time slot may be allocated for each time object frame if the sum of the fractional portion of time slots calculated forms a value more than one accumulated over a number of object frames. The rate of additional time slots in terms of object frame is inversly proportional to the fractional portion of the computed time slots, n, derived from eq. 1. FIG. 5 shows the organisation of object frame, 51 and time slots, 52. In the case where n is a fractional number, the transmission of the object frame is scheduled earlier than the time frame bounded by the object decoding rate, as in, 54. Over several object frame periods, when the fractional portion of the time slots accumulates more than one, one additional time slot, 55, would be allocated for the object frame marked by 54. The allocation of time slot marked by 55 is strictly based on the needs determined by module 48 of the block diagram in FIG. 4. The time frame of the object frame is dynamically updated by the object descriptor at the rate equivalent to the arrival of the network data packet of the object data.

The calculation of an elastic delay is performed by equation 1 and 2. With the preset delay being set by higher application software or set at pre-configured time, the time slot can choose which decoding frame the object can start transmitting. The subsequent object of the same reference must be transmitted within the object decoding time or less. Each node can have a pre-configured delay for the object stream of a specificed object reference.

Figure 6:
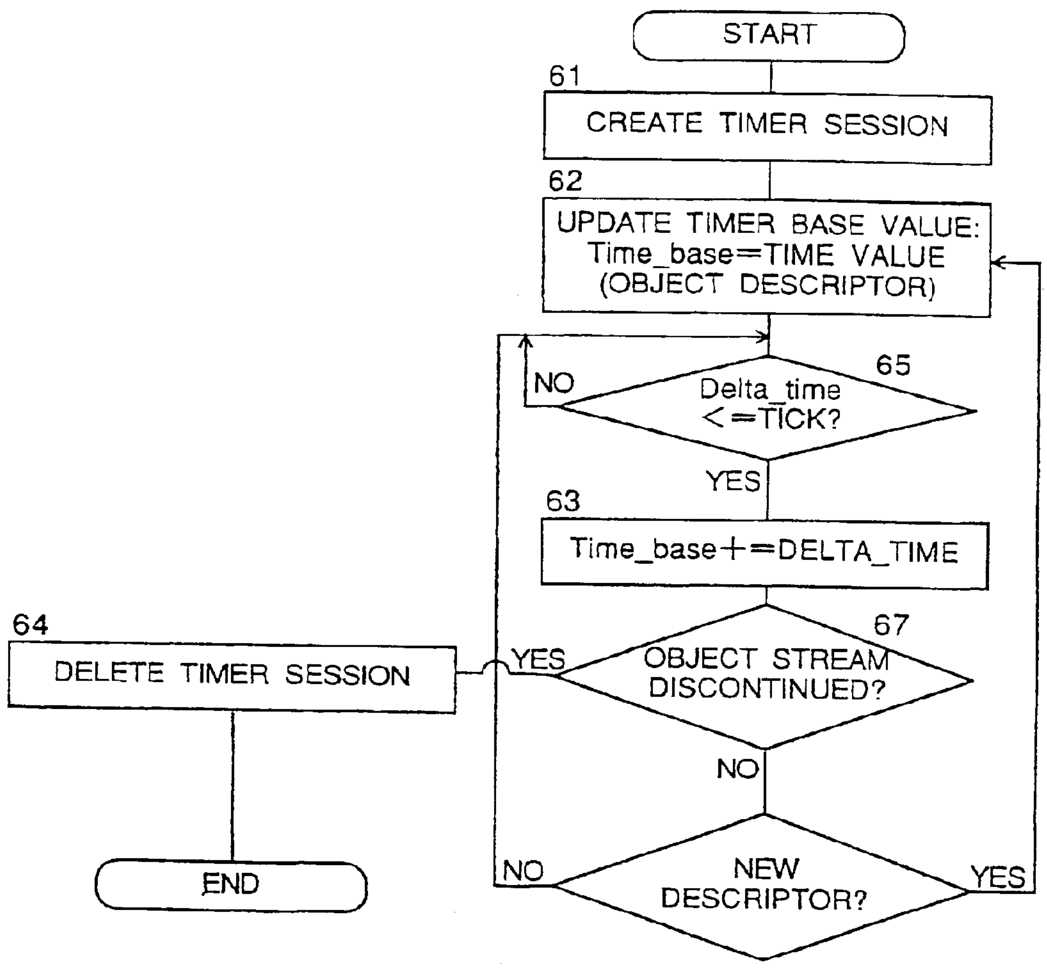
FIG. 6 illustrates a preferred implementation of a timer circuit of a generic object traffic controller for the egress and exchange nodes.

The preferred implementation of the timer as mentioned in blocks 44 and 412 of FIG. 4 and 36 of FIG. 3 is illustrated in FIG. 6. This implementation of the timer is used to provide synchronisation between network components. Each time a timer instance is instantiated, a timer session is created at step 61. An individual timer instance provides a means to insulate the time reference from other object stream object references. The timer is updated with the timing information from the object descriptor, at step 62. The time value in the object descriptor provides the reference decoding time of the object data. All object references with similar major reference number and with the same source and destination address with similar network service access point numeral representative use the timer session. This allows all objects within the same object stream to follow one timing reference. Delta_time refers to the time resolution of the timer circuit. It can be used as timing information for a particular object reference stream. This value is preset based on the timing required for the object reference. Tick is a time reference that increases asymptotically based on the timer resolution adopted by the OS or some hardware clock. The Tick value is decreased by Delta_time if Tick is more than Delta_time at step 625. As the object data forming the same object stream arrives, the timer is updated with the internal time, delta_time, at step 63, with time resolution finer than the time period of one time slot computed. The timer session is deleted if the object stream discontinues the object stream transmission, at step 5, 67, 64.

Figure 7:
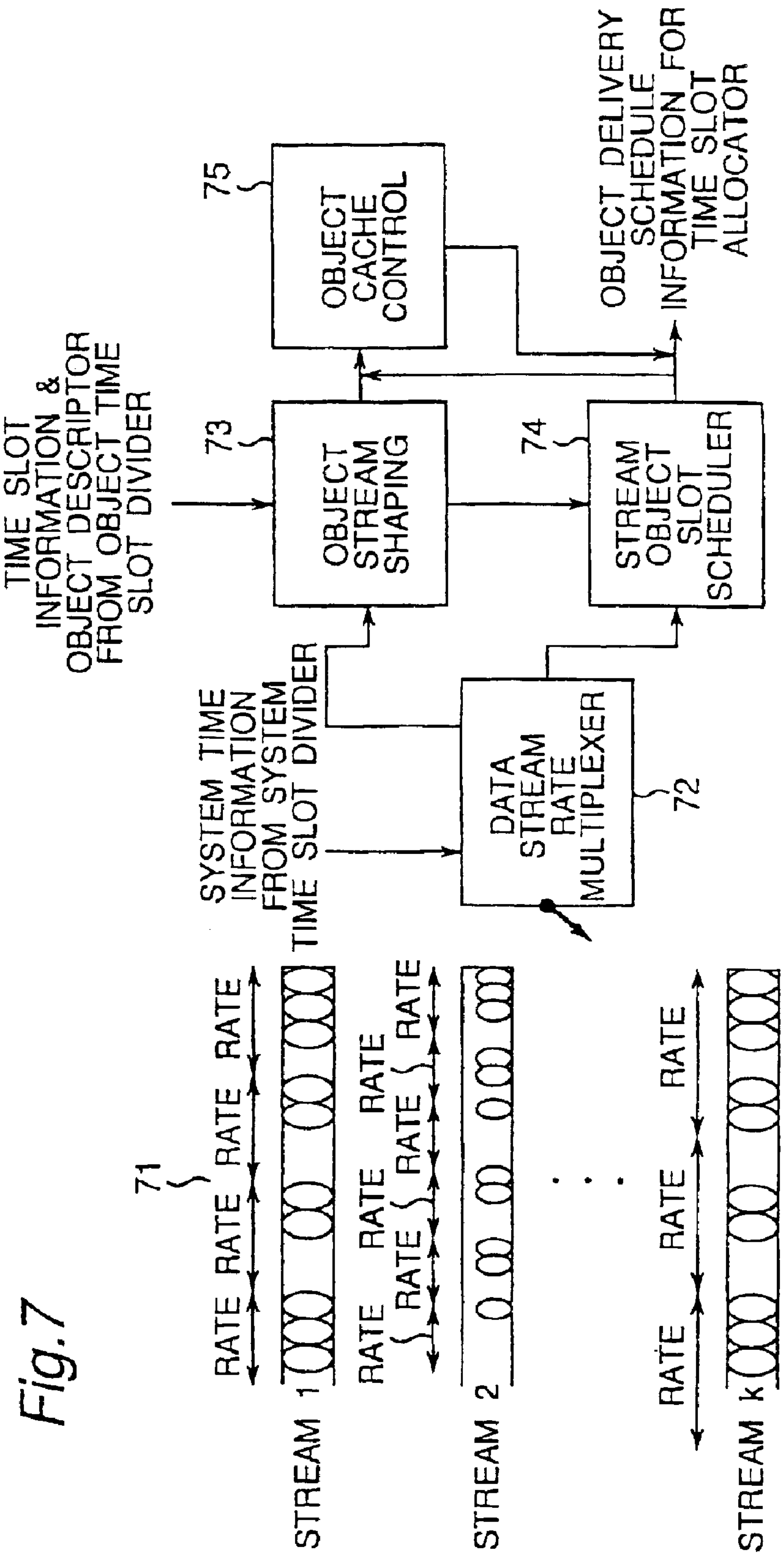
FIG. 7 shows a detailed block diagram of object packet stream traffic control found in the object stream scheduler sub-block of the exchange object traffic controller.

Based on the information from the system time slot divider, time slot information for each individual object stream, and the scheduling of the data object to be streamed out to another destination is performed as shown in FIG. 7. Reference numeral 71 represents an arbitrary number of input object traffic streams entering the node to be re-transmitted to another destination network node. Information such as the stream object descriptor and the information from the output of the time slot divider that provides description of the object are multiplexed by block 72. A full scan for k object streams, 71, by the multiplexer is performed at the maximum rate of the system object frame generated by the system time slot divider, 45. This can be performed at a faster rate if not all the streams have objects for delivery. Besides streaming the information to the stream object slot scheduler, the multiplexer also keeps the statistic of the object stream, as shown in the data structure below. This allows feedback for the dynamic mechanism required by the traffic shaper or filter.

```
Object Stream Statistic {
    Max Object Size in Bytes;
    Min Object Size in Bytes;
    Average Decoding Rate;
    Total Objects received;
}
```

In a preferred form, the multiplexing sequence starts from the object stream with the least decoding rate of 71 and the other precedence classifications then follow.

FIG. 7 shows the detailed description of the object packet stream traffic control. The object stream shaping block 73, performs filtering based on the object data size, the rate of entry and the precedence of each of the objects received from one single stream. The detail of the shaping algorithm can vary depending on the rate of decoding. For the data that meets the filter criteria, reference to the data object is passed to stream object slot scheduler, 74. The stream object scheduler then assigns the object to the time slot to deliver the object within the decoding rate as specified in the object descriptor. The time slot schedule information which refers to the object delivery time, in terms of time slots, is passed to the time slot allocator. References of data objects that did not meet the filter requirements are passed to an object cache control, 75 where information of the cache for the object is passed to the time slot allocator's stream object cache memory of FIG. 8. The object streams in the cache memory are object precedences of lower level which should not be transmitted because the capacity for the stream has reached the assigned bandwidth according to the filter in the object stream shaping block 73.

Figure 8:
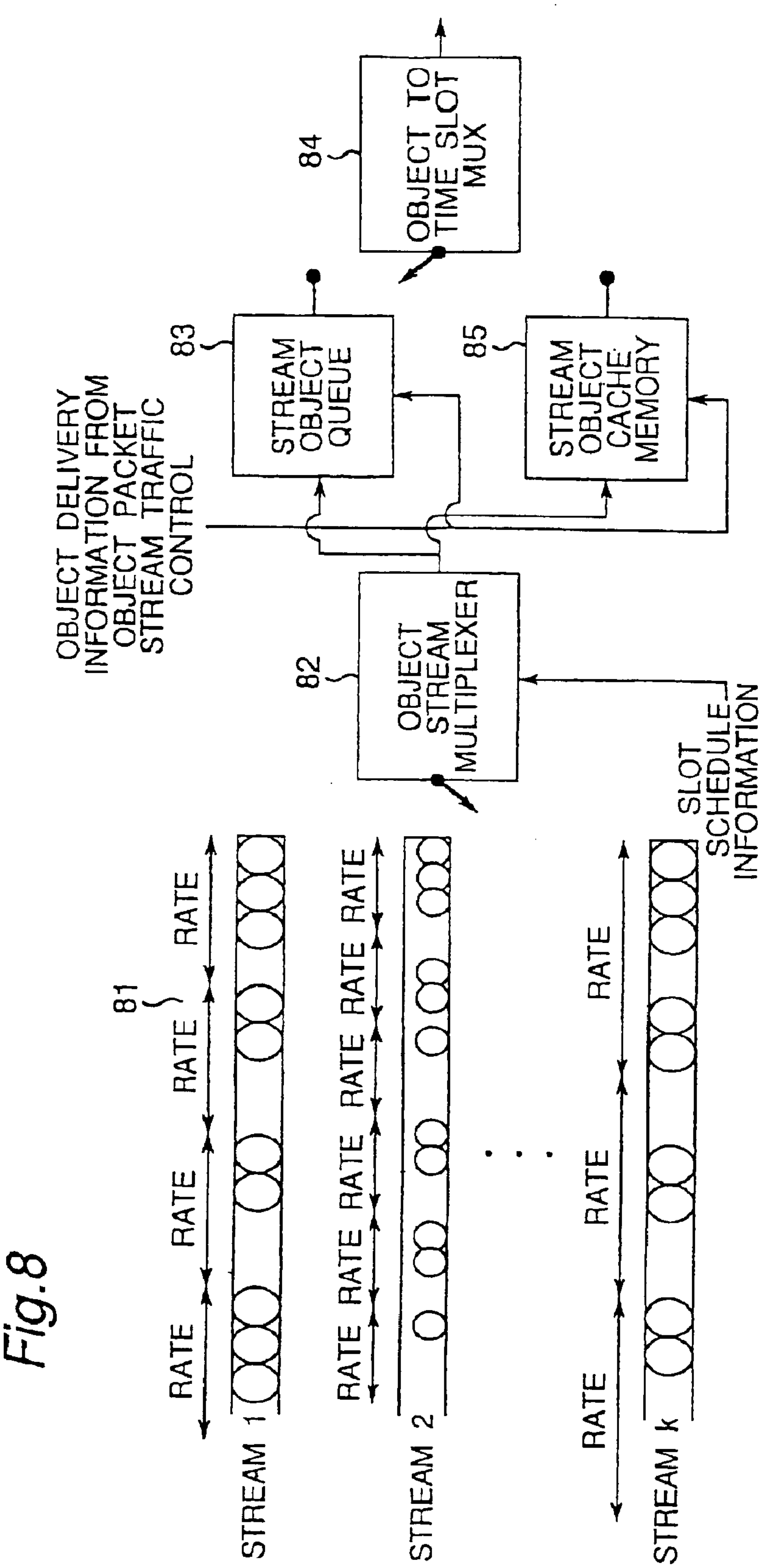
FIG. 8 shows a detailed block diagram of the time slot allocator found in the object stream scheduler sub-block of the exchange object traffic controller.

FIG. 8 shows a functional diagram of the time slot allocator. Reference numeral 81 represents an arbitrary stream traffic received. The object frame created by the time slot allocator is based on the assigned transmission bandwidth and the minimum decoding rate determined from system time slot divider, 43. The time slot schedule information from the object stream traffic control, 48, determines if the data selected by the object stream multiplexer should put the object on a stream object queue, 83 or a stream object cache memory, 85. Based on the queue information from the stream object queue and the stream object cache memory, the object is slotted into the time slot of the object frame. Slotting of object data into a time slot is performed by a object to time slot mux, 84. Because of its finite memory size, the stream object cache memory 85 may choose to discard the longest staying data objects if the memory assigned is used up. If there are free time slots after all the object in the stream object queue as been allotted, the data object in the stream object cache memory is multiplexed out via the object to time slot mux, 84, to be delivered out to the network The minimum queue size for each stream should not be less than the entire object frame size. The total memory assigned for the object stream in both cache memory and queue memory should not exceed the following to meet the total group delay for one node;

Memory Size (Queue & Cache)=Group Delay×(max. Object Size/Decoding Rate) (EQ. 3)

Depending on the amount of delay to be supported, the group delay value of each node need to be updated such that re-allocation of the memory size can be recomputed. The recomputed memory size using eq. 3 determines the maximum group delay per hop.

Figure 9:
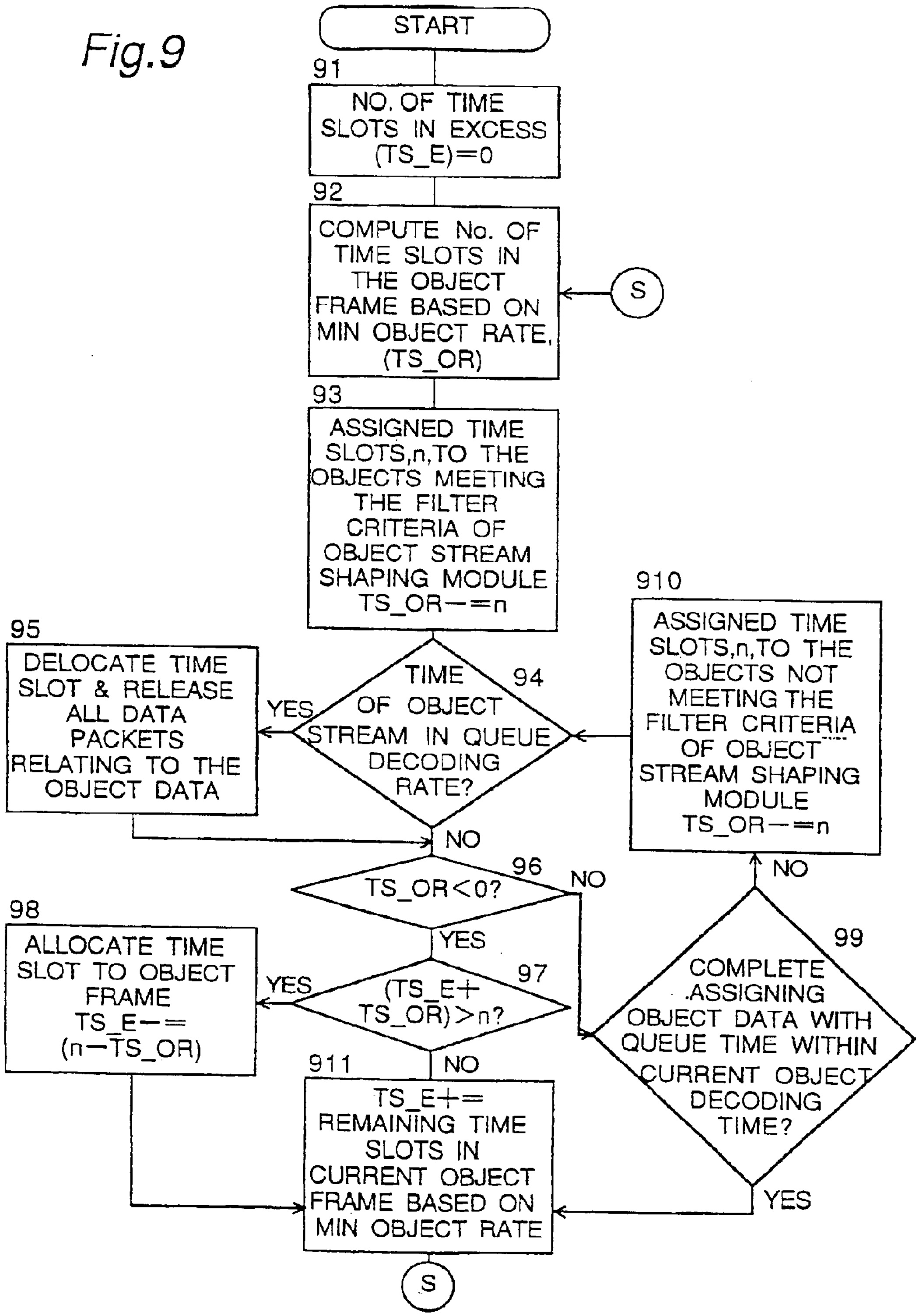
FIG. 9 shows a flowchart of the method of scheduling object data in the time slot allocated for the object frame. This figure also shows how time slots not used for the current object frame are accumulated for future use.

For each object frame computed dynamically by the functional blocks 43, for the system implementing the exchange object traffic controller, a new number of time slots per object are computed using the conditions set forth in eq. 1 and eq. 2. The rate of change is performed at the object frame rate. FIG. 9 shows the flowchart for the allocation and de-allocation of time slots being carried out in the functional block 48. The flowchart assumes that the allocation of all objects based on the allotted bandwidth for the intermediate node and also the precedence criteria to be implemented accordingly for the streams to be delivered is performed based on the preference of one skilled in the art. At step 91, the number of excess time slots is initiated at zero. For each object frame, the number of time slots is computed by functional block, 92, meeting the criteria set forth in eq. 1. Object data to be delivered within the object frame is determined at step 93 based on the data packet in the stream object queue 83. If the objects in both the stream object queue 83 and stream object cache memory 85, have data objects that do not meet the real-time requirement, tested at step 94, packets with the object reference are dropped accordingly at step 95. Objects that meet the real-time requirement meet the criterion that the total time the object data packets resides in the queue is less than the decoding rate of the object stream. Schedule time (t) is defined as the total time spent in the queue and time spent if the object is delivered in the next object frame. If the schedule time (t) is larger than the decoding rate of the object, this means that the data object needs to be delivered in the current object frame. If additional time-slots are required within the object frame, a check is made at step 97, if there are additional time slots saved over from the previous object frame. The additional time slots re-allocated are updated at step 98, which keeps a record of global time slots reserved over an arbitrary period of time. With the excess time slots, data objects in the stream object cache memory are scheduled for delivery next, performed based on criteria in step 99. Assignment of data objects based on the allocated time slots is performed in 910. After all objects with the decoding time frame have been assigned, the remaining time slots for the object frame are saved for future object frames at step 911.

The thus described embodiment of the invention provides system architecture for the apparatus as described in the object traffic controller to be configured and connected to any legacy network structure for end-to-end delivery of real-time data. The apparatus provides a real-time mechanism for the content switching based on timing requirement of individual data streams at the network node performing the routing and switching functions. Network congestion is avoided by discarding object data which may consists of a number of network data packets if the real-time requirement failed to be observed due to heavy network traffic. Discarding objects failing real-time requirement allows efficient use of network resources and also provide an indicator to higher layer software that the bandwidth is insufficient for the session. It also enables the network components to operate in a collaborative effort in streaming real-time traffic through a large network. It also frees up the additional resources required at the client terminals to implement sophisticated protocol stack for providing feedback based on the traffic received. In addition, the system allows real-time with high timing accuracy to be delivered across a wide area network without drastic change to the existing network architecture. The client can receive quality content with graceful degradation when there is network congestion or when the bandwidth to the client reduces due to heavy utilisation of network resources or server resources. On the service and content provider ends, it provides an infrastructure and means to differentiate the real-time services provided for the client based on client's profile. This invention is very useful in delivering real-time data across heterogeneous network to light-weight client with limited network resources and processing power such a mobile PDA or mobile video terminal.

The present disclosure relates to subject matter contained in priority Singapore Patent Application No. 200000085-1, filed on Jan. 7, 2000, the contents of which is herein expressly incorporated by reference in its entirety.

What is claimed is:

1. A method for scheduling the transmission time of multimedia objects, the method comprising:

dividing the transmission time into frames based on an object decoding rate;

further dividing the transmission time within each frame of the multimedia object channel into time slots, the number of time slots being equivalent to dividing the transmission rate by the multimedia object decoding rate;

computing a scheduled object delivery period which is equivalent to a maximum allowable object group delay period;

forming a delivery time schedule of multimedia objects with a time stamp within at least one of the scheduled object delivery period and a frame period for each multimedia object; and re-scheduling objects that cannot be delivered within a current time slot to a later time slot.

2. A method as claimed in claim 1, further comprising dynamically changing the number of time slots per frame by adapting to a changing object decoding rate of the object descriptor and changes to the transmission speed of network link.

3. A method as claimed in claim 1, further comprising computing, allocating and de-allocating the number of time slots dynamically based on current frame by:

computing the number of time slots available for multimedia object delivery in the current object frame;

updating the transmission time slot reserved over buffered object data in both queue memory and cache memory of a stream connection;

de-allocating the time slots of a subsequent frame if transmission of intended multimedia objects cannot be delivered within the assigned frame period; and allocating time slots accumulated from previous object frames if transmission of intended multimedia objects within the specified decoding time frame cannot be delivered within the assigned object frame.

4. A method according the 1, further comprising computing a queue buffer size required for a stream based on the maximum object group delay and maximum multimedia object size.

5. A method as claimed in claim 1, further comprising calculating an elastic delay period for the arrival of multimedia objects based on the maximum object group delay, consisting of at least one of the following delays:

a. end to end delivery delay time for all objects at a value equivalent to the maximum object delay.

b. node re-transmission delay where the maximum object delay is at a value not more than the n multiples of the maximum object delay experienced at each intermediate node between sender and receiver; and c. a queue buffer delay introduced by the queuing algorithm at each intermediate nodes where the maximum delay is based on the size of the queue buffer size divided by the minimum object size.

* * * * *

UNITED STATES PATENT AND TRADEMARK OFFICE

CERTIFICATE OF CORRECTION

PATENT NO. : 6,954,796 B2
APPLICATION NO. : 10/848379
DATED : October 11, 2005
INVENTOR(S) : P. Y. Tan et al.

It is certified that error appears in the above-identified patent and that said Letters Patent is hereby corrected as shown below:

At column 13, line 15 (claim 4, line 1) of the printed patent, "according the" should be --as claimed in claim--.

Signed and Sealed this

Fifteenth Day of August, 2006

JON W. DUDAS

*Director of the United States Patent and Trademark Office*